United States Patent
Woltering et al.

(10) Patent No.: US 7,041,729 B2
(45) Date of Patent: *May 9, 2006

(54) STRUCTURALLY VISCOUS POWDER CLEARCOAT SLURRY FREE FROM ORGANIC SOLVENTS AND EXTERNAL EMULSIFIERS, METHOD FOR PRODUCING THE SAME THE USE THEREOF

(75) Inventors: Joachim Woltering, Münster (DE); Günther Ott, Münster (DE); Fatmir Raka, Münster (DE); Heike Florack, Münster (DE)

(73) Assignee: BASF Coatings AG, Munster (DE)

( * ) Notice: Subject to any disclaimer, the term of this patent is extended or adjusted under 35 U.S.C. 154(b) by 113 days.

This patent is subject to a terminal disclaimer.

(21) Appl. No.: 10/363,176

(22) PCT Filed: Nov. 8, 2001

(86) PCT No.: PCT/EP01/12925

§ 371 (c)(1),
(2), (4) Date: Mar. 6, 2003

(87) PCT Pub. No.: WO02/38685

PCT Pub. Date: May 16, 2002

(65) Prior Publication Data

US 2004/0030038 A1    Feb. 12, 2004

(30) Foreign Application Priority Data

Nov. 9, 2000    (DE) .................................. 100 55 464

(51) Int. Cl.
*C08F 8/30* (2006.01)
*C08K 3/00* (2006.01)

(52) U.S. Cl. .................. 524/591; 524/590; 525/330.5; 525/374; 525/455

(58) Field of Classification Search ................ 524/590, 524/591; 525/123, 124, 440, 455, 330.5, 525/374
See application file for complete search history.

(56) References Cited

U.S. PATENT DOCUMENTS

| | | | |
|---|---|---|---|
| 4,071,428 A | 1/1978 | Bosso et al. ................. 204/181 |
| 4,268,542 A | 5/1981 | Sakakibara et al. .......... 427/195 |
| 4,332,711 A | 6/1982 | Kooymans et al. .......... 523/402 |
| 4,482,721 A | 11/1984 | Wegner et al. ............... 548/262 |
| 4,578,426 A | 3/1986 | Lenz et al. ................... 525/131 |
| 4,939,213 A | 7/1990 | Jacobs, III et al. ....... 525/329.9 |
| 5,084,541 A | 1/1992 | Jacobs, III et al. ........... 528/45 |
| 5,288,865 A | 2/1994 | Gupta ......................... 544/200 |
| 5,326,812 A * | 7/1994 | Diener et al. ................ 524/507 |
| 5,475,073 A | 12/1995 | Guo ............................ 526/333 |
| 5,480,493 A | 1/1996 | Harry, Jr. ......................... 134/4 |
| 5,534,598 A | 7/1996 | Guo ......................... 525/329.2 |
| 5,574,103 A | 11/1996 | Wu et al. .................... 525/127 |
| 5,817,733 A | 10/1998 | Rink ............................ 528/71 |
| 5,852,120 A | 12/1998 | Bederke et al. ............. 525/124 |
| 5,981,653 A | 11/1999 | Wilmes et al. ............... 524/839 |
| 6,093,497 A | 7/2000 | Wiemann .................... 428/500 |
| 6,129,989 A | 10/2000 | Sapper ........................ 428/500 |
| 6,156,117 A | 12/2000 | Freeman ..................... 106/487 |
| 6,177,487 B1 | 1/2001 | Sapper et al. ............... 523/333 |
| 6,187,384 B1 | 2/2001 | Wilke et al. ............. 427/388.4 |
| 6,268,021 B1 | 7/2001 | Flosbach et al. ......... 427/407.1 |
| 6,360,974 B1 | 3/2002 | Sacharski et al. ............. 241/16 |
| 6,624,238 B1 * | 9/2003 | Ott et al. .................... 524/591 |

FOREIGN PATENT DOCUMENTS

| | | |
|---|---|---|
| CA | 2112862 | 4/1922 |
| CA | 2216111 | 4/1996 |
| CA | 2224864 | 6/1996 |
| CA | 2084711 | 9/1999 |
| DE | 4401544 | 7/1995 |
| DE | 19534361 | 3/1997 |
| DE | 19540977 | 5/1997 |
| DE | 19652842 | 6/1997 |
| DE | 19617086 | 10/1997 |
| DE | 196 23 371 | 12/1997 |
| EP | 0012463 | 11/1979 |
| EP | 0038127 | 3/1981 |
| EP | 612818 | 2/1994 |
| EP | 708788 | 6/1994 |
| EP | 652264 | 10/1994 |
| EP | 767185 | 6/1995 |
| GB | 1 530 021 | 2/1976 |
| GB | 1 530 022 | 2/1976 |
| WO | WO 9747674 A1 * | 12/1997 |
| WO | WO98/29465 | 7/1998 |
| WO | WO 00/15721 | 9/1998 |

OTHER PUBLICATIONS

English Abstract for DE 196 52 842 A1.
Ott, et al., U.S. Appl. No. 09/786,956, filed Mar. 12, 2001, pp. 1-33, and Abstract.

* cited by examiner

*Primary Examiner*—Vasu Jagannathan
*Assistant Examiner*—Vickey Ronesi

(57) ABSTRACT

A pseudoplastic powder clearcoat slurry free from organic solvents and external emulsifiers and comprising particles which are solid and/or of high viscosity and are dimensionally stable under storage and application conditions, where the particles have an average size of from 1.0 to 20 μm, at least 99% of the particles having a size ≦30 μm, and comprise as binder at least one polyol with an OH number >110 mg KOH/g, containing potentially ionic groups, and where the powder clearcoat slurry has a potentially ionic group content of from 0.05 to 1 meq/g of solids, at a degree of neutralization of not more than 50% contains from 0.005 to 0.1 meq/g of solids of ionic groups produced by neutralization of the potentially ionic groups, and has a viscosity of (i) from 50 to 1 000 mPas at a shear rate of 1 000 s$^{-1}$, (ii) from 150 to 8 000 mPas at a shear rate of 10 s$^{-1}$, and (iii) from 180 to 12 000 mPas at a shear rate of 1 s$^{-1}$.

7 Claims, No Drawings

STRUCTURALLY VISCOUS POWDER CLEARCOAT SLURRY FREE FROM ORGANIC SOLVENTS AND EXTERNAL EMULSIFIERS, METHOD FOR PRODUCING THE SAME THE USE THEREOF

CROSS REFERENCE TO RELATED APPLICATIONS

This applications is a National Phase Applications of Patent Application PCT/EP01/12925 filed on 8 Nov. 20001, which claims priority on DE 100 55 464.4, filed on 9 Nov. 2000.

The present invention relates to a novel powder clearcoat slurry free from organic solvents and external emulsifiers which possesses pseudoplasticity. The invention relates not least to the use of the novel powder clearcoat slurry for automotive OEM finishing and refinishing, the interior and exterior coating of constructions, the coating of doors, windows and furniture, and industrial coating, including coil coating, container coating and the impregnation and/or coating of electrical components.

BACKGROUND

The German patent DE 198 41 842 C2 discloses a powder clearcoat slurry which is free from organic solvents and external emulsifiers and comprises solid spherical particles with an average size of from 0.8 to 20 µm and a maximum size of 30 µm, said slurry having an ion-forming group content of from 0.05 to 1 meq/g, a neutralizing agent content of from 0.05 to 1 meq/g, and a viscosity of
(i) from 50 to 1 000 mPas at a shear rate of 1 000 $s^{-1}$,
(ii) from 150 to 8 000 mPas at a shear rate of 10 $s^{-1}$,
(iii) from 180 to 12 000 mPas at a shear rate of 1 $s^{-1}$.

The binder used is a methacrylate copolymer having an OH number of 110 mg KOH/g (cf. Preparation Example 1 on page 6 lines 30 to 47 of the patent). The powder clearcoat slurry of Example 1 of the patent (cf. page 7 lines 31 to 54 of the patent), prepared using this binder, has a carboxyl group content of 0.52 meq/g of solids and a carboxylate group content of 0.22 meq/g of solids, from which the degree of neutralization is calculated as 42%. The particle size is 6 µm. The powder clearcoat slurry of Example 2 of the patent (cf. page 7 line 56 to page 8 line 22 of the patent), prepared using the binder, has a carboxyl group content of 0.19 meq/g of solids and a carboxylate group content of 0.10 meq/g of solids, giving a degree of neutralization of 52%.

The known powder clearcoat slurry is prepared by
1) emulsifying an organic solution comprising binder and crosslinker to give an emulsion of the oil-in-water type,
2) removing the organic solvent or the organic solvents, and
3) replacing by water some or all of the volume of solvent removed, to give a powder clearcoat slurry comprising solid spherical particles, where
4) additionally, at least one ionic, especially anionic, thickener and at least one nonionic associative thickener are added to the powder clearcoat slurry.

This powder clearcoat slurry can be prepared with a small number of processing steps; on the basis of its typical powder slurry properties, with residual solvent contents of <1%, and its particle sizes, it exhibits advantageous application characteristics. Even without the assistance of organic solvents, there is generally no popping at the required film thicknesses of approximately 40–50 µm. Moreover, the particles of the slurry, owing to mixing of their constituents in solution, are very homogeneous.

However, the clearcoats produced from the slurry do exhibit blushing when exposed to moisture. Furthermore, they do not achieve the required chemical resistance of clearcoats produced from customary and known, commercial two-component clearcoat materials.

Attempts to eliminate these disadvantages by raising the crosslinking density of the clearcoats are accompanied by new problems. The corresponding powder clearcoat slurries no longer dry in powder form, and at relatively high coat thicknesses, after curing, show film defects in the form of popping marks and stress cracks.

DESCRIPTION

It is an object of the present invention to provide a new powder clearcoat slurry from which the disadvantages of the prior art are now absent and which instead, while continuing to have all of the advantages of the known powder clearcoat slurry, dries in powder form after application, even at high coat thicknesses, and gives clearcoats which do not blush on exposure to moisture, do not display film defects such as popping marks and stress cracks (mudcracking) above a dry film thickness of 50 µm, even without the assistance of organic solvents, and have a chemical stability like that of clearcoats produced from the commercial two-component clearcoat materials.

Accordingly we have found the novel pseudoplastic powder clearcoat slurry free from organic solvents and external emulsifiers and comprising particles which are solid and/or of high viscosity and are dimensionally stable under storage and application conditions, where
1. the particles
   1.1 have an average size of from 1.0 to 20 µm, at least 99% of the particles having a size $\leq 30$ µm, and
   1.2 comprise as binder at least one polyol with an OH number >110 mg KOH/g, containing potentially ionic groups, and where
2. the powder clearcoat slurry
   2.1 has a potentially ionic group content of from 0.01 to 1 meq/g of solids,
   2.2 at a degree of neutralization of not more than 50% contains from 0.005 to 0.1 meq/g of solids of ionic groups produced by neutralization of the potentially ionic groups, and
   2.3 has a viscosity of (i) from 50 to 1 000 mPas at a shear rate of 1 000 $s^{-1}$, (ii) from 150 to 8 000 mPas at a shear rate of 10 $s^{-1}$, and (iii) from 180 to 12 000 mPas at a shear rate of 1 $s^{-1}$.

In the text below, the novel, pseudoplastic powder clearcoat slurry free from organic solvents and external emulsifiers is referred to for short as the "slurry of the invention".

In the light of the prior art, it was surprising and unforeseeable by the skilled worker that the object on which the present invention is based might be achieved firstly by replacing the binder of the known powder clearcoat slurry by a binder which has a higher OH number and secondly by the possibility of overcompensating for the resultant disadvantages by a reduction in the level of ionic groups in the binders, giving overall a profile of properties which exceeded that of the known powder clearcoat slurry.

For the slurry of the invention it is essential that the average size of the solid particles is from 1 to 20 µm and, with particular preference, from 3 to 15 μm. By the average particle size is meant the 50% median value as determined by the laser diffraction method, i.e., 50% of the particles have a diameter ≦the median value and 50% of the particles have a diameter ≧the median value. At least 99% of the particles have a size <30 μm.

Slurries having average particle sizes of this kind and a solvent content of <1% exhibit better application properties and, at the applied film thicknesses of >30 μm as presently practiced in the automotive industry for the finishing of automobiles, exhibit much less of a tendency toward popping and mudcracking than conventional powder clearcoat slurries.

The upper limit on particle size is reached when the size of the particles means that they are no longer able to flow out fully on baking, and thus the film leveling is adversely affected. In cases where requirements regarding the appearance are not very stringent, however, the limit may also be higher. 30 μm is considered a sensible upper limit, since above this particle size the spray nozzles of the highly sensitive application apparatus may become blocked.

The slurry of the invention is free from organic solvents. In the context of the present invention this means that it has a residual volatile solvent content of <1% by weight, preferably <0.5% by weight, and with particular preference <0.2% by weight. In accordance with the invention it is of very particular advantage if the residual content is below the gas chromatography detection limit.

In the context of the present invention, the expression "free from external emulsifiers" is to be understood in the same way.

The above-described particle sizes for use in accordance with the invention are obtained even without the aid of additional external emulsifiers if the slurry of the invention contains from 0.05 to 1, preferably from 0.05 to 0.9, more preferably from 0.05 to 0.8, with particular preference from 0.05 to 0.7, and in particular from 0.05 to 0.6 meq/g of solids of potentially ionic groups.

At a degree of neutralization of not more than 50%, preferably not more than 48%, the slurry of the invention contains from 0.005 to 0.1, preferably from 0.005 to 0.099, more preferably from 0.005 to 0.098, and in particular from 0.005 to 0.097 meq/g of ionic groups produced by neutralization of the potentially ionic groups.

In general, therefore, the chemical nature of the binder is not restrictive provided it comprises ion-forming groups which are convertible by neutralization into salt groups and so are able to take on the function of ionically stabilizing the particles in water.

Suitable anion-forming groups are acid groups such as carboxylic, sulfonic or phosphonic acid groups. Accordingly, the neutralizing agents used are bases, such as alkali metal hydroxides, ammonia, or amines. Alkali metal hydroxides are suitable for use only to a limited extent, since the alkali metal ions are nonvolatile on baking and, owing to their incompatibility with organic substances, may cloud the film and lead to instances of loss of gloss. Consequently, ammonia or amines are preferred. In the case of amines, preference is given to tertiary amines. By way of example, mention may be made of N,N-dimethylethanolamine or aminomethylpropanolamine (AMP).

Suitable cation-forming groups are primary, secondary or tertiary amines. Accordingly, neutralizing agents used are, in particular, low molecular mass organic acids such as formic acid, acetic acid, dimethylolpropionic acid or lactic acid.

Binders which contain cation-forming groups are known from the field of electrodeposition coating materials. By way of example, reference may be made to the patents EP 0 012 463 A1, EP 0 612 818 A1 or U.S. Pat. No. 4,071,428 A.

For the preferred use of the slurry of the invention as unpigmented clearcoat materials in automotive finishing, preference is given to polymers or oligomers containing acid groups as ion-forming groups, since these so-called anionic binders are generally more resistant to yellowing than the class of the cationic binders.

Nevertheless, cationic binders with groups convertible into cations, such as amino groups, are likewise suitable for use in principle provided the field of use is tolerant of their typical secondary properties, such as their tendency toward yellowing.

As binders which contain anion-forming groups, it is possible to use any desired resins containing the abovementioned acid groups. However, it is essential that they also carry hydroxyl groups; i.e., that they are polyols.

In accordance with the invention, the polyols have an OH number >110, preferably from 120 to 180, and in particular from 130 to 160 mg KOH/g.

Examples of suitable binders are hydroxyl-containing, random, alternating and/or block, linear and/or branched and/or comb addition (co)polymers of ethylenically unsaturated monomers, or polyaddition resins and/or polycondensation resins. For further details of these terms, reference is made to Römpp Lexikon Lacke und Druckfarben, Georg Thieme Verlag, Stuttgart, N.Y., 1998, page 457, "Polyaddition" and "Polyaddition resins (polyadducts)", and also pages 463 and 464, "Polycondensates", "Polycondensation" and "Polycondensation resins", and pages 73 and 74, "Binders".

Examples of suitable addition (co)polymers are (meth) acrylate (co)polymers or partially saponified polyvinyl esters, especially (meth)acrylate copolymers.

Examples of suitable polyaddition resins and/or polycondensation resins are polyesters, alkyds, polyurethanes, polylactones, polycarbonates, polyethers, epoxy resins, epoxy resin-amine adducts, polyureas, polyamides, polyimides, polyester-polyurethanes, polyether-polyurethanes or polyester-polyether-polyurethanes.

In addition to the hydroxyl groups, the oligomers and polymers may also contain other functional groups such as acryloyl, ether, amide, imide, thio, carbonate, or epoxide groups, provided they do not disrupt the crosslinking reactions.

These oligomers and polymers are known to the skilled worker, and many suitable compounds are available on the market.

In accordance with the invention, the (meth)acrylate copolymers, the polyesters, the alkyd resins, the polyurethanes and/or the acrylated polyurethanes are of advantage and are therefore used with preference.

Highly suitable (meth)acrylate copolymers and processes for preparing them are described, for example, in the European patent application EP 0 767 185 A1, in the German patents DE 22 14 650 B1 or DE 27 49 576 B1 and in the American patents U.S. Pat. No. 4,091,048 A, U.S. Pat. No. 3,781,379 A, U.S. Pat. No. 5,480,493 A, U.S. Pat. No. 5,475,073 A or U.S. Pat. No. 5,534,598 A or in the standard work Houben-Weyl, Methoden der organischen Chemie, 4th Edition, volume 14/1, pages 24 to 255, 1961. Suitable reactors for the copolymerization are the customary and known stirred vessels, cascades of stirred vessels, tube reactors, loop reactors or Taylor reactors, as described, for example, in the patent applications DE 1 071 241 B1, EP 0 498 583 A1 or DE 198 28 742 A1 or in the article by K.

Kataoka in Chemical Engineering Science, Volume 50, Number 9, 1995, pages 1409 to 1416.

Highly suitable polyesters and alkyd resins and their preparation are described, for example, in the standard work Ullmanns Enzyklopädie der technischen Chemie, 3rd Edition, volume 14, Urban & Schwarzenberg, Munich, Berlin, 1963, pages 80 to 89 and pages 99 to 105, and in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

Highly suitable polyurethanes and/or acrylated polyurethanes and their preparation are described, for example, in the patents EP 0 708 788 A1, DE 44 01 544 A1, or DE 195 34 361 A1.

The binders described above may be used individually or as a mixture of at least two different binders. In accordance with the invention, the (meth)acrylate copolymers afford particular advantages and are therefore used with particular preference.

The amount of the above-described binders in the slurry of the invention may vary widely. The amount is preferably from 5 to 80, more preferably from 6 to 75, with particular preference from 7 to 70, with very particular preference from 8 to 65, and in particular from 9 to 60% by weight, based in each case on the solids of the powder slurry of the invention.

Suitable crosslinking agents are all crosslinking agents that are customary in the field of light-stable clearcoats. Examples of suitable crosslinking agents are amino resins, as described for example in Römpp Lexikon Lacke und Druckfarben, Georg Thieme Verlag, 1998, page 29, "Amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A1 or EP 0 245 700 A1, and in the article by B. Singh and coworkers, "Carbamylmethylated Melamines, Novel Crosslinkers for the Coatings Industry", in Advanced Organic Coatings Science and Technology Series, 1991, volume 13, pages 193 to 207;

carboxyl-containing compounds or resins, as described for example in the patent DE 196 52 813 A1 or 198 41 408 A1, especially 1,12-dodecanedicarboxylic acid, resins or compounds containing epoxide groups, as described for example in the patents EP 0 299 420 A1, DE 22 14 650 B1, DE 27 49 576 B1, U.S. Pat. No. 4,091,048 A or U.S. Pat. No. 3,781,379 A;

tris(alkoxycarbonylamino)triazines, as described in the patents U.S. Pat. No. 4,939,213 A, U.S. Pat. No. 5,084,581 A, U.S. Pat. No. 5,288,865 A or in the patent application EP 0 604 922 A;

blocked polyisocyanates, as described for example in the patents U.S. Pat. No. 4,444,954 A1, DE 196 17 086 A1, DE 196 31 269 A1, EP 0 004 571 A1 or EP 0 582 051 A1; or beta-hydroxyalkylamides such as N,N,N',N'-tetrakis (2-hydroxyethyl)adipamide or N,N,N',N'-tetrakis (2-hydroxypropyl)adipamide.

The crosslinking agents described above may be used individually or as a mixture of at least two crosslinking agents. In accordance with the invention, the blocked polyisocyanates and/or tris(alkoxycarbonyl-amino)triazines afford particular advantages and are therefore used with particular preference.

The amount of crosslinking agent in the slurry of the invention may likewise vary widely and is guided primarily by the functionality and amount of the binders on the one hand and by the functionality of the crosslinking agents on the other. The amount is preferably from 20 to 95, more preferably from 25 to 94, with particular preference from 30 to 93, with very particular preference from 35 to 92, and in particular from 40 to 90% by weight, based in each case on the solids of the slurry of the invention.

The slurry of the invention comprises nonionic and ionic thickeners. This effectively counters the tendency of the comparatively large solid particles toward sedimentation.

Examples of nonionic thickeners are hydroxyethylcellulose and polyvinyl alcohols. Nonionic associative thickeners are likewise available on the market in diverse selection. They generally consist of water-dilutable polyurethanes, which are the reaction products of water-soluble polyetherdiols, aliphatic diisocyanates and monofunctional hydroxy compounds containing an organophilic radical.

Likewise commercially available are ionic thickeners. These usually contain anionic groups and are based in particular on special polyacrylate resins containing acid groups, some or all of which may have been neutralized.

Examples of suitable thickeners for use in accordance with the invention are known from the text book "Lackadditive" by Johan Bieleman, Wiley-VCH, Weinheim, N.Y., 1998, pages 31 to 65.

For the slurry of the invention it is advantageous if both of the above-described types of thickener are present therein. The amount of thickeners to be added and the ratio of ionic to nonionic thickener is guided by the desired viscosity of the slurry of the invention, which in turn is determined by the required sedimentation stability and by the special requirements of spray application. The skilled worker will therefore be able to determine the amount of the thickeners and the ratio of the thickener types to one another on the basis of simple considerations, possibly with the aid of preliminary tests.

According to the invention, a viscosity range of from 50 to 1 500 mpas at a shear rate of 1 000 $s^{-1}$ and from 150 to 8 000 mPas at a shear rate of 10 $s^{-1}$, and also from 180 to 12 000 mPas at a shear rate of 1 $s^{-1}$ is set.

This viscosity behavior, known as "pseudoplasticity", describes a state which does justice both to the requirements of spray application, on the one hand, and to the requirements in terms of storage and sedimentation stability, on the other: in the state of motion, such as when pumping the slurry of the invention in circulation in the ring circuit of the coating installation and when spraying, for example, the slurry of the invention adopts a state of low viscosity which ensures easy processability. Without shear stress, on the other hand, the viscosity rises and thus ensures that the coating material already present on the substrate to be coated has a reduced tendency to form runs on vertical surfaces. In the same way, a result of the higher viscosity in the stationary state, such as during storage, for instance, is that sedimentation of the solid particles is largely prevented or that any slight degree of settling of the powder slurry of the invention during the storage period can be removed again by agitation.

In addition to the essential constituents described above, the solid particles of the slurry of the invention may comprise additives as commonly used in clearcoat materials. In this context it is essential that these additives do not substantially lower the glass transition temperature Tg of the binders.

Examples of suitable additives are polymers, crosslinking catalysts, defoamers, adhesion promoters, additives for improving substrate wetting, additives for improving surface smoothness, flatting agents, light stabilizers, corrosion inhibitors, biocides, flame retardants, and polymerization inhibitors, especially photoinhibitors, as described in the book "Lackadditive" by Johan Bielemann, Wiley-VCH, Weinheim, N.Y., 1998.

Crosslinking components of polyol type, reactive diluents or leveling assistants which may be incorporated by crosslinking in the film may be added to the slurry of the invention. It is important, however, that these components are located preferably in the external, aqueous phase of the slurry of the invention and not in the disperse organic phase, where they would bring about a lowering of the glass transition temperature Tg and thus coalescence or coagulation of any sedimented particles. Examples of suitable constituents of this kind are thermally curable reactive diluents such as positionally isomeric diethyloctanediols or hydroxyl-containing hyperbranched compounds or dendrimers as described in the German patent applications DE 198 05 421 A1, DE 198 09 643 A1, and DE 198 40 405 A1.

Moreover, the slurry of the invention may also comprise constituents curable with actinic radiation, if it is to be curable both thermally and with actinic radiation. By actinic radiation is meant electro-magnetic radiation such as near infrared, visible light, UV radiation or X-rays, especially UV radiation, or corpuscular radiation such as electron beams. The conjoint use of heat and actinic radiation is also known as dual cure.

In order to obtain a dual-cure slurry of the invention, it is possible to incorporate (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially acrylate groups, into the binders described above, such incorporation taking place by means, for example, of polymer-analogous reactions.

An alternative option is to add constituents as commonly employed in coating materials curable with actinic radiation.

Examples of such constituents include
the binders envisaged for use in UV-curable clearcoat materials and powder clearcoat materials and described in the European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, in the German patent applications DE 197 09 467 A1, DE 42 03 278 A1, DE 33 16 593 A1, DE 38 36 370 A1, DE 24 36 186 A1 or DE 20 03 579 B1, in the international patent applications WO 97/46549 or WO 99/14254 or in the American patents U.S. Pat. No. 5,824,373 A, U.S. Pat. No. 4,675,234 A, U.S. Pat. No. 4,634,602 A, U.S. Pat. No. 4,424,252 A, U.S. Pat. No. 4,208,313 A, U.S. Pat. No. 4,163 810 A,
U.S. Pat. No. 4,129,488 A, U.S. Pat. No. 4,064,161 A or U.S. Pat. No. 3,974,303 A;
reactive diluents curable with actinic radiation, such as those described in Römpp Lexikon Lacke und Druckfarben, Georg Thieme Verlag, Stuttgart, N.Y., 1998, on page 491 under the entry "Reactive diluents"; or photoinitiators as described in Römpp Chemie Lexikon, 9th, expanded and revised edition, Georg Thieme Verlag Stuttgart, Vol. 4, 1991, or in Römpp Lexikon Lacke und Druckfarben, Georg Thieme Verlag, Stuttgart, 1998, pages 444 to 446.

The slurry of the invention may be prepared by the processes as described in the patent applications DE195 40 977 A1, DE 195 18 392 A1, DE 196 17 086 A1, DE-A-196 13 547, DE 196 18 657 A1, DE 196 52 813 A1, DE 196 17 086 A1, DE-A-198 14 471 A1, DE 198 41 408 A1, or DE 198 41 842 A1 or C2. It is of advantage in accordance with the invention to prepare the slurry of the invention by means of the process described in DE 198 41 842 A1 or C2.

In this process, the ionically stabilizable binders and the crosslinking agents and also, if appropriate, the additives are mixed in organic solution and dispersed together in water with the aid of neutralizing agents by the secondary dispersion process. The system is then diluted with water, while stirring. A water-in-oil emulsion is formed first of all, which on further dilution changes to become an oil-in-water emulsion. This point is generally reached at solids contents of <50% by weight, based on the emulsion, and is evident externally from a relatively sharp drop in viscosity in the course of dilution.

The emulsion thus obtained, which still contains solvent, is subsequently freed from solvents by means of azeotropic distillation.

The distillation temperature is guided primarily by the glass transition temperature Tg of the binder. In order to avoid coagulum, i.e., coalescence of the particles, which are only slightly stabilized in accordance with the invention, to form a separate continuous organic phase during the distillation, it is essential that the distillation temperature be held below the glass transition temperature Tg. The glass transition temperature may also be described, as a substitute, by the minimum film-forming temperature of the dispersion. The minimum film-forming temperature may be determined by drawing down the dispersion onto a glass plate using a bar coater and heating it in a gradient oven. The temperature at which the pulverulent layer films is designated the minimum film-forming temperature.

In accordance with the invention it is of advantage if the minimum film-forming temperature is more than 20° C., in particular more than 30° C. For further details, reference is made to Römpp Lexikon Lacke und Druckfarben, Georg Thieme Verlag, Stuttgart, N.Y., 1998, "Minimum film-forming temperature", page 391.

It is of advantage in accordance with the invention if the solvents to be removed are distilled off at a distillation temperature below 70° C., preferably below 50° C. and in particular below 40° C. If appropriate, the distillation pressure is chosen so that in the case of higher-boiling solvents this temperature range is still maintained.

At its simplest, the azeotropic distillation may be realized by stirring the emulsion at room temperature in an open vessel for several days. In the preferred case, the solvent-containing emulsion is freed from the solvents by a vacuum distillation.

In order to avoid high viscosities, the amount of water and solvents removed by distillation or evaporation is replaced by water. The water may be added before, during or after the evaporation or distillation, in portions.

After the solvents have been lost, the glass transition temperature Tg of the dispersed particles rises, and instead of the previous solvent-containing emulsion (liquid-in-liquid dispersion) a solid-in-liquid dispersion, i.e., the slurry of the invention, is formed.

Preferably, the particles of the resultant slurry are mechanically comminuted in the wet state, which is known as wet milling. In this case it is preferred to employ conditions such that the temperature of the milled material does not exceed 70° C., preferably 60° C., and in particular 50° C. Preferably, the specific energy input during the milling process is from 10 to 1 000, more preferably from 15 to 750, and in particular from 20 to 500 Wh/g.

For wet milling it is possible to employ a very wide variety of equipment which produces high or low shear fields.

Examples of suitable equipment which produces low shear fields are customary and known stirred vessels, slot homogenizers, microfluidizers, and dissolvers.

Examples of suitable equipment which produces high shear fields are customary and known stirred mills and in-line dissolvers.

Particular preference is given to employing the equipment which produces high shear fields. Of these, the stirred mills are particularly advantageous in accordance with the invention and are therefore used with very particular preference.

During wet milling, generally, the slurry of the invention is supplied to the above-described equipment and circulated therein by means of appropriate devices, such as pumps, until the desired particle size has been reached.

The slurry of the invention advantageously has a solids content of from 10 to 60% by weight, in particular from 20 to 50% by weight.

The slurry of the invention is preferably filtered prior to its use. This is done using the customary and known filtration equipment and filters, as also suitable for filtering the known powder clearcoat slurries. The mesh size of the filters may vary widely and is guided primarily by the particle size and particle-size distribution of the particles of the slurry of the invention. The skilled worker will therefore easily be able to determine the appropriate filters on the basis of this physical parameter. Examples of suitable filters are bag filters. These are available on the market under the brand names Pong® or Cuno®. It is preferred to use bag filters having mesh sizes of from 10 to 50 µm, examples being Pong® 10 to Pong® 50.

To produce the clearcoats of the invention, the slurry of the invention is applied to the substrate that is to be coated. No special measures need be taken here; instead, the application may take place in accordance with the customary and known techniques, which is another particular advantage of the slurry of the invention.

Following its application, the slurry of the invention dries without problems and does not film at the processing temperature, generally at room temperature. In other words, the slurry of the invention applied as a wet film loses water when flashed off at room temperature or slightly elevated temperatures, without the particles present therein altering their original solid form. The solid film in powder form loses the residual water by evaporation more easily than a flowing wet film. As a result, the risk of bubbles of evaporated water enclosed in the cured film (popping) is reduced. Moreover, the tendency toward mudcracking is extremely low. A surprising finding in this context is that the mudcracking tendency of the slurries of the invention is lower the higher their particle sizes.

In the subsequent baking step, the now substantially water-free powder layer is melted and caused to crosslink. In some cases, it may be of advantage to carry out the leveling process and the crosslinking reaction with a chronological offset, by operating in accordance with a staged heating program or a so-called heating ramp. The appropriate crosslinking temperature for the present examples is between 120 and 160° C. The corresponding baking time is between 20 and 60 minutes.

In the case of the dual-cure slurry of the invention, thermal curing is supplemented by curing with actinic radiation, using the customary and known radiation sources.

The clearcoat which results in this case has outstanding performance properties. For instance, it adheres firmly to all customary and known basecoats or to substrates such as metal, glass, wood, ceramic, stone, concrete or plastic. It is of high gloss, smooth, scratch-resistant, stable to weathering and chemicals, and even at high coat thicknesses is free from defects such as stress cracks or popping marks. It no longer exhibits any blushing on exposure to moisture.

On the basis of this advantageous profile of properties, the slurry of the invention is outstandingly suitable for automotive OEM finishing, automotive refinishing, the interior and exterior coating of constructions, the coating of doors, windows and furniture, and industrial coating, including coil coating, container coating and the impregnation and/or coating of electrical components. It is used in particular to produce clearcoats as part of multicoat color and/or effect coating systems, which are produced from basecoat materials and the slurry of the invention in accordance with the customary and known wet-on-wet techniques.

EXAMPLES AND COMPARATIVE EXPERIMENTS

Preparation Example 1 (Comparative)

The Preparation of the Solution Polyacrylate Resin A in Accordance with Preparation Example 1, Section 1.1, of DE 198 41 842 C2

1 291.5 parts by weight of methyl isobutyl ketone (MIBK) and 43.0 parts by weight of mercaptoethanol were introduced into a reaction vessel and heated to 100° C. The initiator, consisting of 143.5 parts by weight of TBPEH (tert-butyl perethylhexanoate) and 86.1 parts by weight of MIBK, and the monomer mixture, consisting of 485.0 parts by weight of tert-butyl acrylate, 254.0 parts by weight of n-butyl methacrylate, 213.8 parts by weight of cyclohexyl methacrylate, 409.0 parts by weight of hydroxypropyl methacrylate and 73.2 parts by weight of acrylic acid, were metered into this initial charge at 100° C. over the course of 5 h from two separate feed vessels. The reaction mixture was then heated to 110° C., and a fraction of the volatile components of the reaction mixture was stripped off under reduced pressure at 500 mbar for 5 h. The resin solution was then cooled to 80° C. and discharged.

The resin solution had the following characteristics:

| | |
|---|---|
| Solids: | 70.2% (1 h at 130° C.) |
| Viscosity: | 25.5 dPas (cone and plate viscometer at 23° C.; 70% strength solution) |
| Acid number: | 43.4 mg KOH/g resin solids |
| OH number: | 110 mg KOH/g resin solids. |

Preparation Example 2 (Comparative)

The Preparation of the Solution Polyacrylate Resin B in Accordance with Preparation Example 1, Section 1.2, of DE 198 41 842 C2

1 076.7 parts by weight of methyl isobutyl ketone (MIBK) and 35.9 parts by weight of mercaptoethanol were introduced into a reaction vessel and heated to 100° C. The initiator, consisting of 119.6 parts by weight of TBPEH (tert-butyl perethylhexanoate) and 71.8 parts by weight of MIBK, and the monomer mixture, consisting of 404.2 parts by weight of tert-butyl acrylate, 211.7 parts by weight of n-butyl methacrylate, 239.2 parts by weight of cyclohexyl methacrylate and 340.9 parts by weight of hydroxypropyl methacrylate, were metered into this initial charge at 100° C. over the course of 5 h from two separate feed vessels. The reaction mixture was then heated to 115° C., and a fraction of the volatile components of the reaction mixture was stripped off under reduced pressure at 500 mbar for 3 h. The resin solution was then cooled to 80° C. and discharged.

The resin solution had the following characteristics:

| | |
|---|---|
| Solids: | 71.3% (1 h at 130° C.) |
| Viscosity: | 19.2 dPas (cone and plate viscometer at 23° C.; 70% strength solution) |
| Acid number: | 5 mg KOH/g resin solids |
| OH number: | 110 mg KOH/g resin solids. |

Preparation Example 3

The Preparation of a Solution Polyacrylate Resin C Which can be Used in Accordance with the Invention 412 parts by weight of methyl ethyl ketone were introduced into a reaction vessel and heated to 80° C. The initiator, consisting of 49 parts by weight of VAZO® 67 (azobisisovaleronitrile) and 49 parts by weight of methyl ethyl ketone, and the monomer mixture, consisting of 137.2 parts by weight of tert-butyl acrylate, 73.5 parts by weight of n-butyl methacrylate, 98 parts by weight of cyclohexyl methacrylate, 171.5 parts by weight of hydroxyethyl methacrylate and 9.8 parts by weight of acrylic acid, were metered into this initial charge at a uniform rate at 80° C. with stirring over the course of six hours from two separate feed vessels. The reaction mixture was then held at 80° C. for 1.5 hours. A fraction of the volatile components of the reaction mixture was then stripped off under reduced pressure for five hours until the solids content was 70% by weight. The resultant resin solution was cooled to 50° C. and discharged.

The resin solution had the following characteristics:

| | |
|---|---|
| Solids: | 69.2% (1 h at 130° C.) |
| Viscosity: | 3.8 dPas (cone and plate viscometer at 23° C.; 55% strength solution, diluted with xylene) |
| Acid number: | 9.8 mg KOH/g resin solids |
| OH number: | 150 mg KOH/g resin solids. |

Preparation Example 4

The preparation of a Blocked Polyisocyanate Based on Isophorone Diisocyanate 837 parts by weight of isophorone diisocyanate were introduced into an appropriate reaction vessel, and 0.1 part by weight of dibutyl tin dilaurate was added. A solution of 168 parts by weight of trimethylolpropane and 431 parts by weight of methyl ethyl ketone was then run in slowly. As a result of the exothermic reaction, the temperature rose. After it had reached 80° C., the temperature was kept constant by external cooling and the rate of addition of the feed stream was reduced slightly if necessary. After the end of the feed stream, the mixture was held at this temperature for about 1 hour until the isocyanate content of the solids had reached 15.7% (based on NCO groups). The reaction mixture was subsequently cooled to 40° C. and a solution of 362 parts by weight of 3,5-dimethylpyrazole in 155 parts by weight of methyl ethyl ketone was added over the course of 30 minutes. After the reaction mixture had heated up to 80° C., owing to the exothermic reaction, the temperature was kept constant for 30 minutes until the NCO content had dropped to less than 0.1%. Then 47 parts by weight of n-butanol were added to the reaction mixture, which was held at 80° C. for a further 30 minutes and then, after brief cooling, was discharged.

The reaction product had a solids content of 69.3% (1 h at 130° C.).

Preparation Example 5

The Preparation of a Blocked Polyisocyanate Based on Hexmethylene Diisocyanate 534 parts by weight of Desmodur® N 3300 (commercial isocyanurate of hexamethylene diisocyanate from Bayer AG) and 200 parts by weight of methyl ethyl ketone were introduced into a reaction vessel and heated to 40° C. 100 parts by weight of 2,5-dimethylpyrazole were added to this solution, with cooling, and the exothermic reaction was allowed to subside. Subsequently, with continued cooling, a further 100 parts by weight of 2,5-dimethylpyrazole were added. After the exothermic reaction had again subsided, a further 66 parts by weight of 2,5-dimethylpyrazole were added. Thereafter, cooling was shut off, as a result of which the reaction mixture heated up slowly to 80° C. It was held at this temperature until its isocyanate content had dropped to below 0.1%. The reaction mixture was subsequently cooled and discharged.

The resultant solution of the blocked polyisocyanate had a solids content of 81% by weight (1 h at 130° C.) and a viscosity of 3.4 dPas (70% strength in methyl ethyl ketone; cone and plate viscometer at 23° C.).

Comparative Experiments C1 and C2

The Preparation of the Noninventive Powder Clearcoat Slurries C1 and C2

Comparative Experiment C1

The Preparation of the Noninventive Powder Clearcoat Slurry C1 on the Basis of the Solution Polyacrylate Resin A from Preparation Example 1

812.1 parts by weight of the acrylate resin solution A from Preparation Example 1 and 492.5 parts by weight of the solution of the block polyisocyanate from Preparation Example 4 were mixed at room temperature in an open vessel for 15 minutes with stirring. Then 16.2 parts by weight of Cyagard 1164 (UV absorber from Cytec), 9.6 parts by weight of Tinuvin liquid 123 (sterically hindered amine "HALS" from Ciba Geigy), 15.2 parts by weight of N,N-dimethylethanolamine and 7.0 parts by weight of dibutyltin dilaurate (DBTL) were added and the mixture was stirred at room temperature for a further 2 h. The mixture was then diluted with 561.3 parts by weight of deionized water in small portions. After an interval of 15 minutes, a further 676.0 parts by weight of DI water were added. This gave an aqueous emulsion of low viscosity with a theoretical solids content of 37% which was stirred at room temperature for a further 48 hours. The amount of liquid evaporated off was supplemented by adding DI water until the original level was regained. This gave a powder clearcoat slurry having the following characteristics:

| | |
|---|---|
| Solids (2 h, 80° C.): | 35.6% |
| Carboxyl group content: | 0.52 meq/g solids |
| Neutralizing agent content: | 0.22 meq/g solids |
| Degree of neutralization: | 42% |
| Solvent content: | <0.05% (by gas chromatography) |
| Particle size: | 6 μm (D.50; laser diffractometer from Malvern) |

In order to produce the desired pseudoplasticity, 8.7 parts by weight of Acrysol® RM 8 (nonionic associative thickener from Rohm & Haas) and 6.0 parts by weight of Viskalex® (thickener from Allied Colloids) were incorporated by stirring into 1 000 parts by weight of the powder clearcoat slurry.

The viscosity profile of the resultant powder clearcoat slurry 1 was as follows:
1 405 mPas at a shear rate of 10 s$^{-1}$
791 mPas at a shear rate of 100 s$^{-1}$
308 mPas at a shear rate of 1 000 s$^{-1}$ The powder clearcoat slurry C1 had a minimum film-forming temperature of 35° C.

Comparative Experiment C2

The Preparation of the Noninventive Powder Clearcoat Slurry C2 on the Basis of the Solution Polyacrylate Resins A and B from Preparation Examples 1 and 2

331.0 parts by weight of the acrylate resin A from Preparation Example 1, 774.5 parts by weight of the acrylate resin B from Preparation Example 2 and 715.8 parts by weight of the solution of the blocked polyisocyanate from Preparation Example 4 were mixed with one another as described in Example 1. Then 4.8 parts by weight of Cyagard 1146, 7.6 parts by weight of Tinuvin 123, 10.0 parts by weight of N,N-dimethylethanolamine and 5.5 parts by weight of DBTL were added. After 2 hours of stirring, 723.0 parts by weight of DI water were added in small portions and the resultant mixture was diluted 15 minutes later with a further 910.0 parts by weight of DI water. The resulting powder clearcoat dispersion was transferred to a reactor and the solvent was removed as an azeotrope with the accompanying water under reduced pressure at from 25 to 35° C., the amount of distillate being replaced in the course of the distillation by 2 000 parts by weight of DI water in small portions, by way of a vacuum dropping funnel with a three-way tap. The distillation was continued until residual solvent was no longer detectable. The characteristics of the resulting powder clearcoat slurry were as follows:

| | |
|---|---|
| Solids (2 h, 80° C.): | 44.3% |
| Carboxyl group content: | 0.19 meq/g solids |
| Neutralizing agent content: | 0.10 meq/g solids |
| Degree of neutralization: | 52% |
| Solvent content: | <0.05% (by gas chromatography) |
| Particle size: | 7 μm (D.50; laser diffractometer from Malvern) |

In order to produce the desired pseudoplasticity, 7.8 parts by weight of Acrysol® RM 8 and 4.7 parts by weight of Viskalex HV 30 were incorporated by stirring into 1 000 parts by weight of the powder clearcoat slurry. The viscosity profile of the resultant powder clearcoat slurry 2 was as follows:
5 243 mPas at a shear range of 10 s$^{-1}$
569 mPas at a shear range of 1 000 s$^{-1}$ The minimum film-forming temperature was 43° C.

Comparative Experiments C3 and C4

The use of the Noninventive Powder Clearcoat Slurries C1 (Comparative Experiment C1) and C2 (Comparative Experiment C2) to Produce the Noninventive Clearcoats C3 and C4

The powder clearcoat slurries C1 and C2 were applied using a so-called integrated system, which is described below for the metallic shade "meteor gray":

Using a gravity feed gun, a functional coat (Ecoprime® Meteorgrau [meteor gray]; BASF Coatings AG) was applied to steel panels coated cathodically with a commercial electrocoat material. After flashing off at room temperature for 5 minutes, a meteor gray aqueous metallic basecoat (Ecostar® Meteorgrau; BASF Coatings AG) was applied in the same way to this coat and was subsequently predried at 80° C. for 5 minutes.

After the panels had been cooled, the noninventive powder clearcoat slurries C1 (Comparative Experiment C3) and C2 (Comparative Experiment C4) were applied in the same way. Thereafter, the panels were first flashed off for 5 minutes and then predried at 40° C. for 15 minutes. They were subsequently baked at 145° C. for 30 minutes.

In the case of Comparative Experiment C3, this gave an aqueous metallic overall coating system in the shade "meteor gray". The applied wet films had been chosen so that, after baking, the dry film thicknesses for the functional coat and for the aqueous metallic basecoat were each 15 μm. The clearcoat C3 had a film thickness of from 40 to 45 μm.

The second panel, prepared in the same way, with the powder clearcoat slurry C2 (Comparative Experiment C4) again had a film thickness of 15 μm in each case for the functional coat and for the aqueous metallic basecoat. The clearcoat 3 had a film thickness of from 44 to 48 μm.

The performance properties of the noninventive clearcoats C3 and C4 are compared in the table with the performance properties of the noninventive clearcoat C6 and the inventive clearcoat.

Comparative Experiment C5

The Preparation of the Noninventive Powder Clearcoat Slurry C5

855.2 parts by weight of the acrylate resin solution from Preparation Example 3, 205.1 parts by weight of the solution of the blocked polyisocyanate from Preparation Example 4 and 415.1 parts by weight of the solution of the blocked polyisocyanate from Preparation Example 5 were mixed at room temperature in an open vessel for 15 minutes with stirring. Then 42.9 parts by weight of Cyagard® 1664L (commercial UV absorber from Cytec), 10.7 parts by weight of Tinuvin® 123 (sterically hindered amine "HALS" from Ciba), 5.3 parts by weight of benzoin, 7.835 parts by weight of N,N-dimethylethanolamine and 0.857 part by weight of dibutyl tin dilaurate were added to the resultant mixture and was stirred at room temperature for a further two hours. The mixture was then diluted with 676.9 parts by weight of deionized water in small portions. After an interval of 15 minutes, a further 780 parts by weight of DI water were added at a uniform rate over the course of 30 minutes. This gave an aqueous emulsion of low viscosity with a theoretical solids content of 37% by weight.

The aqueous emulsion was then diluted with a further 425.2 parts by weight of deionized water. Thereafter, under reduced pressure on a rotary evaporator, the same amount of a mixture of volatile organic solvents in water was removed from it, after which the solids content was again at 37% by weight (1 h at 130° C).

The characteristics of the resulting powder clearcoat slurry were as follows:

| | |
|---|---|
| Solids (1 h at 130° C.): | 36.9% |
| Carboxyl group content: | 0.096 meq/g solids |
| Neutralizing agent content: | 0.079 meq/g solids |
| Degree of neutralization: | 85% |
| Solvent content: | <0.05% (by gas chromatography) |
| Particle size: | 0.9 μm (D.50; laser diffractometer from Malvern) |

In order to produce the desired pseudoplasticity, 79 parts by weight of Acrysol® RM 8 and 22.7 parts by weight of Viskalex HV 30 were incorporated by stirring into the powder clearcoat slurry.

Comparative Experiment C6

The Production of a Noninventive Clearcoat C6

Comparative Experiment C3 was repeated but using the powder clearcoat slurry C5 from Comparative Experiment C5 instead of the powder clearcoat slurry C1, with a film thickness of the clearcoat of from 39 to 44 μm.

The performance properties of the noninventive clearcoat C6 are compared in the table with the performance properties of the noninventive clearcoats C3 and C4 and the inventive clearcoat from Example 2.

Example 1

The Preparation of an Inventive Powder Clearcoat Slurry

Comparative Experiment C5 was repeated but using 4.148 parts by weight of N,N-dimethylethanolamine rather than 7.835 parts by weight, and with the film thickness of clearcoat being from 45 to 49 μm.

Prior to the adjustment of the viscosity, the characteristics of the inventive powder clearcoat slurry were as follows:

| | |
|---|---|
| Solids (1 h at 130° C.): | 36.7% |
| Carboxyl group content: | 0.096 meq/g solids |
| Neutralizing agent content: | 0.045 meq/g solids |
| Degree of neutralization: | 45% |
| Solvent content: | <0.05% (by gas chromatography) |
| Particle size: | 4.8 μm (D.50; laser diffractometer from Malvern) |

Example 2

The Production of an Inventive Clearcoat

Comparative Experiment C6 was repeated but using the inventive powder clearcoat slurry from Example 1 rather than the noninventive powder clearcoat slurry C5.

The performance properties of the inventive clearcoat from Example 2 are compared in the table with the performance properties of the noninventive clearcoats C3, C4 and C6.

TABLE

The performance properties of the inventive clearcoat (Example 2) and of the noninventive clearcoats C3, C4 and C6

| | Comparative experiments: | | | |
|---|---|---|---|---|
| Property | C3 | C4 | C6 | Example 2 |
| Film thickness (μm) | 40–45 | 40–48 | 39–44 | 45–49 |
| Gloss at 20°[*] | 77 | 77 | 81 | 84 |
| Haze[**] | 80 | 84 | 41 | 24 |
| Appearance | bright | glossy | blisters cracks | bright without defect |
| Leveling | very good | good | good | very good |
| Chemical resistance:[**] | | | | |
| 1% strength sulfuric acid | 56 | 46 | 40 | 42 |
| Pancreatin | 54 | >58 | 42 | 43 |
| Tree resin | 44 | 41 | 43 | 47 |
| Water | 54 | 49 | 55 | >62 |
| Popping limit (μm)[***] | 45 | 48 | 45 | 65 |

[*]Measuring instrument, manufacturer Byk;
[**]Measurement by means of gradient oven, manufacturer Byk. The numerical value indicates the lower temperature in ° C. above which drops of the corresponding substance applied to the coating left visible traces;
[***]Determined by wedge application.

A comparison of the results in the table shows that the inventive clearcoat has a significantly higher resistance to moisture and a significantly higher popping limit, in combination with better gloss and haze. Whereas blushing was observed in the case of the noninventive clearcoats C3, C4 and C6, it no longer occurred with the inventive clearcoat.

What is claimed is:

1. A pseudoplastic powder clearcoat slurry free from organic solvents and external emulsifiers, comprising
    particles which are dimensionally stable under storage and application conditions, the particles having an average size of from 1.0 to 20 μm and a particle size distribution wherein at least 99% of the particles have a size <30 μm, and
    a binder, said binder comprising at least one polyol comprising ion-forming groups convertible into salt groups by neutralization and an OH number of from 130 mg KOH/g to 160 mg KOH/g,
wherein said pseudoplastic powder clearcoat slurry has a viscosity of (i) from 50 to 1 000 mPas at a shear rate of 1 000 $s^{-1}$, (ii) from 150 to 8 000 mPas at a shear rate of 10 $s^{-1}$, and (iii) from 180 to 12 000 mPas at a shear rate of 1 $s^{-1}$ and comprises
    from 0.01 to 1 meq/g of solids of ion-forming groups convertible into salt groups by neutralization, and
    from 0.005 to 0.1 meq/g of solids of ionic groups produced by neutralization of the ion-forming group at not more than 50% neutralization.

2. The slurry of claim 1, wherein the polyol comprises a (meth)acrylate copolymer.

3. The slurry of claim 1, comprising a solids content of from 10 to 60% by weight.

4. The slurry of claim 1, further comprising ionic thickeners and nonionic associative thickeners.

5. The slurry of claim 1, wherein the particles comprise a crosslinking agent selected from the group consisting of blocked polyisocyanates, tris(alkoxycarbonylamino)triazines and mixtures thereof.

6. The slurry of claim 1, having a minimum film-forming temperature of more than 20° C.

7. A method of making a coated substrate, comprising applying the slurry of claim 1 to a substrate selected from the group consisting of automotive OEM finishing substrates, automotive refinishing substrates, interior construction substrates, exterior construction substrates, door substrates, window substrates, furniture substrates, industrial coating substrates, coil coating substrates, container coating substrates, and electrical component substrates.

* * * * *